Patented Feb. 3, 1942

2,271,819

UNITED STATES PATENT OFFICE 2,271,819

DISTEMPER VACCINE AND METHOD OF PREPARING THE SAME

Robert G. Green, Minneapolis, Minn., assignor to Fromm Laboratories, Inc., Hamburg, Wis., a corporation of Wisconsin No Drawing. Application February 6, 1939, Serial No. 254,972

4 Claims. (Cl. 167—78)

In my Patent No. 2,136,131, patented November 8, 1938, I have described a method of preparing a distemper vaccine for foxes and dogs by passing the virus of typical canine distemper serially through ferrets. The resulting vaccine is useful for the immunization of all members of the family Canidae. By this treatment, within reasonable limits, the virus becomes progressively more virulent for the ferrets but progressively less virulent for foxes, dogs and other members of the family Canidae. Up to more than fifty passages through ferrets the virus shows this increasing virulence for ferrets and the decreasing virulence for dogs and foxes. It is of course possible that the passage of the virus through the ferrets might be continued for so long that it would show no further increase in virulence for ferrets. On the other hand it is conceivable that the modification of the virus by passage through ferrets might be carried so far that it would no longer serve to immunize foxes and dogs. However, as appears in said patent, an appreciable modification of the virus becomes apparent after from five to ten passages through ferrets and this modification continues through more than fifty passages to the point at which it produces only a mild disease in foxes accompanied by immunization with a death rate of less than 0.5%.

Ferret is the common name generally applied to animals of the species Putoris also called polecats and fitches.

I have now found that the distemper virus demonstrated by Carré and more clearly defined by Laidlaw and Dunkin, i. e., the typical canine distemper virus is capable of modification by serial passage through minks (Mustela luteola), weasels (Mustela nivalis), stoates (Mustela erminia) and all members of the marten genus (Martes) to produce a vaccine capable of immunizing foxes, dogs and closely related animals against the disease.

The vaccine is characterized by the fact that it shows a materially reduced mortality rate when injected into red foxes. This reference to red foxes is merely for the purpose of identification and is not to be understood as limiting the utility of the vaccine to red foxes. The vaccine is effective for the immunization of other members of the family Canidae.

As a part of my investigations on distemper in foxes, dogs and other animals I have found that this virus may be readily recognized in them by the presence of cytoplasmic inclusions in certain cells, and that distemper may be further and more accurately defined by the demonstration of these inclusions. I have identified the virus in various animals and have studied the transmission of the disease among these animals from one species to another, and have made the following findings.

As the distemper virus is found in nature it has the ability to produce virulent infections in various diverse species of animals, and as different natural strains are isolated they may vary somewhat in the degree of virulent disease which they produce in the different animals, but not to a significant degree.

I have further found that by serial passage, a distemper virus having the ability at one time to infect several diverse species of animals with a virulent disease can be modified in a definite manner in some species to produce a mild and symptomless infection in certain other species.

Specifically I have found that the distemper virus passed serially through minks (Mustela luteola), weasels (Mustela nivalis), stoates (Mustela erminia) and all members of the marten genus (Martes) will develop after about ten passages a greatly lessened virulence for red foxes and will produce a mild infection which however will immunize the foxes against virulent distemper.

The modification is plainly evident after about ten serial passages and in all cases results in a marked degree of modification as the number of passages is increased. In a typical case, passage of a distemper virus through minks serially for twenty virus generations results in a virus which will not show, usually, any mortality effect when injected into as many as ten red foxes.

Modification of the virus may be accomplished by serial passage through a single species such as minks or by alternating serial passage through two species or in any other manner serially through a plurality of species of the group minks (Mustela luteola), weasels (Mustela nivalis), stoates (Mustela erminia) and all members of the marten genus (Martes).

The serial transmission may be accomplished by inoculating an animal of the group minks, weasels, stoates and martens, e. g. the mink, by direct brain injection with active distemper virus and when the animal sickens or dies, using infected tissue, e. g. spleen emulsion from it to infect another animal of the group, e. g. another mink, and so on for a sufficient number of passages to produce the desired degree of modification of the virus.

The modified virus is used to protect animals of the family Canidae, e. g. dogs, wolves and foxes, by infecting them, e. g. by injection. Known expedients such as attenuation of the modified virus, for instance by drying or other known or usual method of attenuation or the use of the modified virus with serum may be employed. Vaccines produced by serial passage through any two species of the group minks (*Mustela luteola*), weasels (*Mustela nivalis*), stoates (*Mustela erminia*) and all members of the marten genus (Martes) are distinguishable by precipitin tests but they are essentially identical in so far as they are practically harmless to and capable of immunizing the species of the family Canidae.

I claim:

1. Method of modifying distemper virus for the production of a vaccine capable when injected into red foxes of immunizing the same against typical distemper which comprises passing the virus serially through animals of the group consisting of minks, weasels, stoates and martens for a sufficient number of passages to materially reduce the normal distemper death rate of red foxes injected therewith.

2. Method as defined in claim 1 in which the virus is passed serially for at least ten generations.

3. A distemper vaccine comprising distemper virus modified by serial passage through animals of the group consisting of minks, weasels, stoates and martens for a sufficient number of passages to materially reduce the normal distemper death rate in red foxes injected therewith, said vaccine being capable of immunizing red foxes against distemper.

4. A distemper vaccine as defined in claim 3 produced by serial passage for at least ten generations.

ROBERT G. GREEN.